United States Patent
Faucette (10) Patent No.: US 12,071,736 B2
(45) Date of Patent: Aug. 27, 2024

(54) DEVICES, SYSTEMS AND METHODS FOR EROSION CONTROL

(71) Applicant: Conwed Plastics Acquisition Company V LLC, Alpharetta, GA (US)

(72) Inventor: Britt Faucette, Decatur, GA (US)

(73) Assignee: Conwed Plastics Acquisition Company V LLC, Minneapolis, MN (US)

( * ) Notice: Subject to any disclaimer, the term of this patent is extended or adjusted under 35 U.S.C. 154(b) by 554 days.

(21) Appl. No.: 17/154,537

(22) Filed: Jan. 21, 2021

(65) Prior Publication Data

US 2021/0222388 A1    Jul. 22, 2021

Related U.S. Application Data

(60) Provisional application No. 62/964,021, filed on Jan. 21, 2020.

(51) Int. Cl.
| | |
|---|---|
| *E02D 17/20* | (2006.01) |
| *B01D 24/20* | (2006.01) |
| *B01D 39/04* | (2006.01) |
| *B65D 30/00* | (2006.01) |
| *B65D 33/01* | (2006.01) |
| *B65D 65/46* | (2006.01) |

(Continued)

(52) U.S. Cl.
CPC ........... *E02D 17/202* (2013.01); *B01D 24/20* (2013.01); *B01D 39/04* (2013.01); *B65D 29/00* (2013.01); *B65D 33/01* (2013.01); *B65D 65/466* (2013.01); *C02F 1/001* (2013.01); *E02B 3/127* (2013.01); *E02D 3/00* (2013.01); *B01D 2239/0266* (2013.01); *C02F 2103/001* (2013.01); *E02D 2200/13* (2013.01); *E02D 2300/00* (2013.01); *E02D 2300/0004* (2013.01); *E02D 2300/0037* (2013.01); *E02D 2300/0071* (2013.01); *E02D 2300/0078* (2013.01); *E02D 2300/0079* (2013.01)

(58) Field of Classification Search
CPC ......... E02D 17/20; E02D 17/205; E02B 3/12; E02B 3/125; E02B 3/127
See application file for complete search history.

(56) References Cited

U.S. PATENT DOCUMENTS

| | | | |
|---|---|---|---|
| 4,853,269 A | 8/1989 | Fukumori et al. | |
| 6,524,670 B1 * | 2/2003 | Kataoka | E02B 3/127 428/36.1 |

(Continued)

FOREIGN PATENT DOCUMENTS

| | | | |
|---|---|---|---|
| CA | 2535801 C | 8/2007 | |
| CN | 112144471 A * | 12/2020 | ............. B65D 29/00 |

(Continued)

OTHER PUBLICATIONS

International Search Report and Written Opinion; PCT/US2021/014395; Apr. 13, 2021.

*Primary Examiner* — Frederick L Lagman
(74) *Attorney, Agent, or Firm* — Farber LLC (57) ABSTRACT

A high strength environmental control device comprising a mesh container having at least one interior and one exterior surface is provided. The interior of the mesh container can comprise a filler material. The mesh container can comprise a plurality of yarns, including viscose fibers, interlaced together.

37 Claims, 2 Drawing Sheets

(51) Int. Cl.
   *C02F 1/00*      (2023.01)
   *E02B 3/12*      (2006.01)
   *E02D 3/00*      (2006.01)
   *C02F 103/00*       (2006.01)

(56) References Cited

U.S. PATENT DOCUMENTS

| | | | |
|---|---|---|---|
| 6,905,289 B1 * | 6/2005 | Sanguinetti | E03F 5/0404 |
| | | | 405/21 |
| 7,029,208 B1 | 4/2006 | Santha | |
| 7,563,058 B2 * | 7/2009 | Sadowski | E02D 17/202 |
| | | | 405/302.6 |
| 7,862,259 B2 | 1/2011 | Carpenter | |
| 8,821,076 B2 | 9/2014 | Tyler | |
| 9,044,795 B2 | 6/2015 | Tyler | |
| 10,253,474 B2 | 4/2019 | Allard | |
| 10,280,578 B2 | 5/2019 | Santha | |
| 10,745,881 B2 | 8/2020 | Zock et al. | |
| 2008/0016759 A1 | 1/2008 | Tyler | |
| 2009/0016826 A1 | 1/2009 | Carpenter | |
| 2009/0071596 A1 | 3/2009 | Theisen et al. | |
| 2015/0240438 A1 | 8/2015 | Santha | |
| 2017/0204582 A1 * | 7/2017 | Allard | E02D 17/205 |
| 2017/0298589 A1 | 10/2017 | Szebalskie et al. | |

FOREIGN PATENT DOCUMENTS

| | | | | |
|---|---|---|---|---|
| DE | 36 04 015 A1 | 8/1987 | | |
| FR | 3032727 A1 | 8/2016 | | |
| KR | 200333123 | * 11/2003 | | E02B 3/125 |
| KR | 100834083 B1 | * 6/2008 | | |
| KR | 20080112635 A | * 12/2008 | | B65D 29/00 |
| WO | WO2004014122 A1 | 2/2004 | | |

* cited by examiner

Fig. 1

```
┌─────────────────┐
│ Providing       │
│ plurality of    │    210
│ yarns including │
│ viscose fibers  │
└─────────────────┘

┌─────────────────┐
│ Interlacing a   │
│ plurality of    │    220
│ yarns to        │
│ form a mesh     │
└─────────────────┘

┌─────────────────┐
│ Placing filler  │
│ within the      │    230
│ interior of the │
│ mesh            │
└─────────────────┘
```

FIG. 2

DEVICES, SYSTEMS AND METHODS FOR EROSION CONTROL

CROSS-REFERENCE TO RELATED APPLICATIONS

This application claims benefit of U.S. provisional application No. 62/964,021 filed Jan. 21, 2020, the contents of which are incorporated herein by reference in their entirety.

TECHNICAL FIELD

The present invention generally relates to a system for environmental control and, more particularly, to a device for controlling erosion and runoff having high strength and comprising a mesh formed of interlaced yarns which include viscose fibers.

BACKGROUND

Surface runoff or currents on shorelines and embankments can spread into and/or erode surrounding environments if not properly controlled. Such runoff is especially common during construction and other land remediation projects. Controlling the path of water is important as the erosion process can result in the loss of topsoil and the spread of environmental pollutants. Techniques to control soil erosion have included the installation of perimeter barriers such as straw bales and silt fences. While each are suitable for their intended purposes, they have limitations and are generally unattractive.

Additional systems have been established for controlling stormwater runoff, for example by utilizing berms and the like. While suitable for their intended purposes, such berms either lack the strength to effectively provide for an environmentally functioning control or utilize synthetic materials to provide the strength, but generally do not biodegrade, thereby requiring an eventual return to the installation site for removal.

Accordingly, a need exists for an environmental control system which utilizes an elongated fully biodegradable mesh container filled with a filler material which has sufficient strength to effectively provide for the environmental control.

SUMMARY

The present disclosure generally relates to a system for environmental control and, more particularly, an innovative medium for controlling erosion and runoff having high strength and comprising an elongated biodegradable mesh.

According to an exemplary embodiment of the present disclosure, an environmental control device is provided. The environmental control device may comprise a mesh container having at least one interior and one exterior surface, wherein the interior of the mesh container comprises a filler material. The mesh container comprises a plurality of yarns interlaced together, which includes viscose fibers. The mesh container also has openings of an approximate predetermined size.

In one exemplary embodiment, the environmental control device is biodegradable. In one embodiment, the environmental control device has a tensile strength of at least about 100 pounds per square inch using ASTM standard testing method D4595. In another embodiment, the environmental control device has a tensile strength of at least about 150 pounds per square inch using ASTM standard testing method D4595. In a preferred embodiment, the environmental control device has a tensile strength of at least about 200 pounds per square inch using ASTM standard testing method D4595.

In one exemplary embodiment, the mesh of the environmental control device comprises interlaced yarns. In one embodiment, the interlacing of yarns is accomplished by knitting. In another exemplary embodiment, the interlacing of yarns is accomplished by weaving.

In some embodiments, the mesh container of the environmental control device is configured to be closed at two opposed ends. In some embodiments, the device has additional mesh through which an anchoring tool can be placed to secure the device onto the earth surface.

In some embodiments, the mesh comprises viscose fibers. In one embodiment, at least some of the yarns are viscose fibers. In another embodiment, the mesh consists of viscose fibers. In some embodiments, at least some of the yarns comprise two or more different fibrous components. In some embodiments, the fibrous components are selected from the group consisting of viscose, hemp, flax, and cotton fibers. In one embodiment, the viscose fibers of the mesh of the environmental control device are fabricated from soft wood. In some embodiments, the soft wood is spruce or poplar.

In some embodiments, the mesh container of the environmental control device comprises one or more fibers selected from the group consisting of viscose, cotton, flax, and hemp fibers. In one embodiment, the mesh of the environmental control device includes a first yarn made from viscose fibers, a second yarn made form hemp fibers and the viscose fiber yarn and the hemp fiber yarn are interlaced to form the mesh container. In other embodiments, the mesh of the environmental control device includes a first yarn made from viscose fibers, a second yarn made from cotton fibers and the viscose fiber yarn and the cotton fiber yarn are interlaced to form the mesh container. In other embodiments, the mesh of the environmental control device includes a first yarn made from viscose fibers, a second yarn made form flax fibers and the viscose fiber yarn and the flax fiber yarn are interlaced to form the mesh container.

In one embodiment, the mesh container of the environmental control device is tied at two opposed ends. In some exemplary embodiments, the filler material of the environmental control device is disposed within the interior of the mesh container using a pneumatic blower. In other embodiments, the filler material is disposed into the mesh container interior using an auger. In still other embodiments, the filler material is disposed into the mesh container interior by hand. In some embodiments, the filler material includes a member selected from the group consisting of compost, composted organic materials, organic feedstocks, composted products, mulch, wood shavings, alum, lime, clay, pea gravel, gravel, sand, soil, wood chips, bark, peat, soil blends, straw, hay, leaves, sawdust, paper mill residuals, wood wastes, wood pellets, hemp, bamboo, biosolids, coconut fibers, coir, wheat straw, rice straw, rice hulls, oat straw, soybean hulls, palm wastes, palm leaves, agricultural waste products, manure, wool, hair, sugar cane bagasse, seed hulls, jute, flax, hulls, organic waste, cat litter, plant seeds, plugs, sprigs, spores, fertilizers, flocculants, chemical binders, water absorbers and combinations thereof.

In one embodiment, the environmental control device filters water. In some embodiments, the mesh container degrades within at least thirty-six months of environmental installation. In some embodiments, the device has a tensile strength of at least about 200 pounds per square inch as measured using ASTM standard testing method D4595 and a yarn count of at least eight hundred deniers. In some embodiments, the mesh container has a diameter greater than about four inches.

According to another exemplary embodiment of the present disclosure, a method for forming an environmental control system is provided. The method may comprise providing one or more environmental control devices, wherein each environmental control device comprises a mesh container having at least one interior and one exterior surface and openings of a predetermined approximate size. The mesh also comprises viscose fibers and the interior of the mesh container comprises a filler material. Additionally, the one or more environmental control devices are positioned on an earth surface in a perceived path of water flow or runoff such that the environmental control devices will intersect the path thereby preventing or slowing the water flow or runoff.

In some embodiments, the mesh container of the one or more environmental control devices of the environmental control system is biodegradable and degrades within thirty-six months of environmental installation. In some embodiments, the mesh is formed by woven or knit yarns. In one exemplary embodiment of the environmental control system, the yarns are comprised of one hundred percent viscose fibers.

In some embodiments, additional environmental control devices are positioned such that the water flow obstructed by the environmental control system is diverted to a different area, thereby creating a runoff diversion.

In some embodiments of the method of forming an environmental control system, the earth surface is a coastal surface. In some embodiments, the system prevents erosion of an earth surface. In some embodiments, the water flow is that of stormwater. In some exemplary embodiments, the runoff carries substances which are not desired to be spread in an environment.

In some embodiments, the environmental control system is used for any member of the group consisting of erosion control, sediment control, perimeter control, sediment trap, sediment barrier, slope interruption, check dam, inlet protection, runoff diversion, concrete washout, biofiltration, bioswale, passive filtration, stormwater filtration, wastewater filtration, riser pipe filtration, stormwater pretreatment, wastewater pretreatment, bank stabilization, channel restoration, stream restoration, riparian restoration, wetland restoration, living shoreline restoration, oyster bag restoration, and combinations thereof.

According to another exemplary embodiment, an environmental control device is provided which comprises a biodegradable mesh container having at least one interior and one exterior surface and openings of a predetermined approximate size. The mesh comprises viscose fibers and the device has a tensile strength of at least about 100 pounds per square inch using ASTM standard testing method D4595. In some embodiments, the device has a tensile strength of at least about 150 pounds per square inch using ASTM standard testing method D4595. In some embodiments, at least about 200 pounds per square inch using ASTM standard testing method D4595.

BRIEF DESCRIPTION OF THE DRAWINGS

Certain embodiments of the disclosure will be more readily understood through the following detailed description, with reference to the accompanying drawings, in which.

DETAILED DESCRIPTION

The present disclosure generally relates to devices, systems, and methods used for controlling erosion, retaining sediment, preventing siltation, treating runoff, removing or inhibiting the spread of pollutants, remediating environmental damage, protecting plants, bordering play areas, absorbing spills, establishing vegetation, protecting ecosystems, and/or restoring waterways and/or other riparian areas.

In some embodiments of the present disclosure, a system is provided that can include mesh containers and/or enclosures that are filled with any of a variety of materials, including compost, composted products, mulch, sawdust, soil, gravel, and/or various other organic and/or inorganic substances. Such filled devices can be filled on-site, which can reduce the transportation cost of the systems. Moreover, such filled devices can be relatively heavy, thereby avoiding floating away in heavy rain.

The environmental control devices may be placed in a variety of locations such as for example, on an erosion-prone slope, across a small drainage ditch, or surrounding a drain. It is understood that the devices may be used on other types of earth surface, such as for example, a coastal surface. The devices can be held in place by their own weight and/or by stakes, which can be driven through the devices and into the ground. In some embodiments, attached to the devices can be additional anchoring mesh, through which anchors can be driven to secure the devices to the ground. If so desired, the anchors may be biodegradable.

In some embodiments, the interior of the mesh container is filled with compost using a pneumatic blower and the compost-filled device is installed on-site. The devices can be filled using a pneumatic blower, such as for example a pneumatic blower truck. It is understood that the device may be filled using alternative methods, such as for example, using an auger or by hand.

Figure 1:
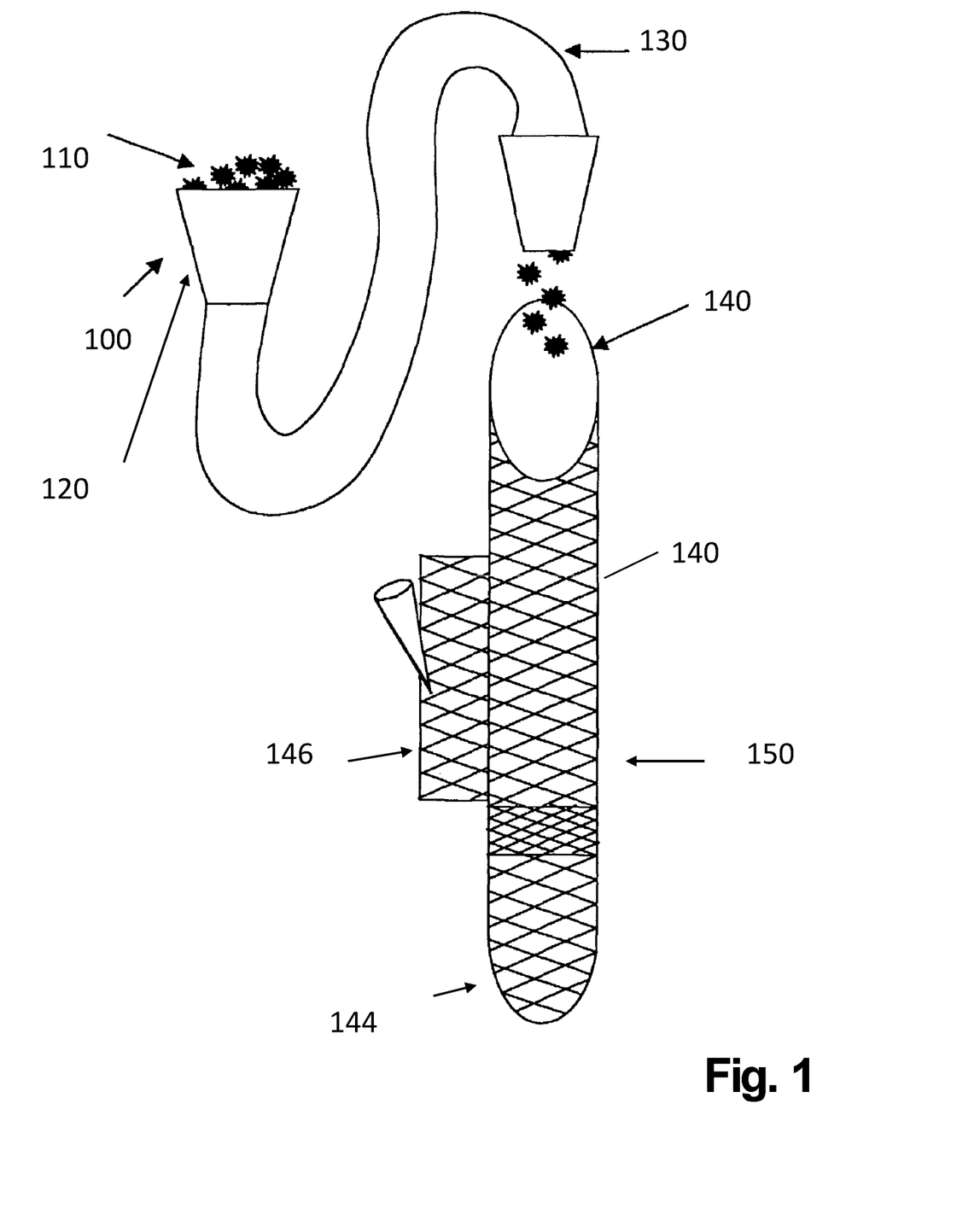
FIG. 1 is a block diagram of an embodiment of a system 100 of the present disclosure.

FIG. 1 is a block diagram of an exemplary embodiment of a system 100 which is an exemplary delivery method for delivering a filler material 110. System 100 can include the filler material 110, which can be contained in a storage container 120 and delivered via a delivery mechanism 130 to a mesh container 140. Filler material 110 can include any of a number of materials, including compost, composted organic materials, organic feedstocks, composted products, mulch, wood shavings, alum, lime, clay, pea gravel, gravel, sand, soil, wood chips, bark, peat, soil blends, straw, hay, leaves, sawdust, paper mill residuals, wood wastes, wood pellets, hemp, bamboo, biosolids, coconut fibers, coir, wheat straw, rice straw, rice hulls, oat straw, soybean hulls, palm wastes, palm leaves, agricultural waste products, manure, wool, hair, sugar cane bagasse, seed hulls, jute, flax, hulls, organic waste, cat litter, plant seeds, plugs, sprigs, and/or spores, fertilizers, flocculants, chemical binders, water absorbers, etc.

In some embodiments, the filler material 110, such as for example compost, can provide treatment of runoff water by physically draining the runoff. In some embodiments, this biologically degrades unwanted, harmful, and/or polluting substances. In some embodiments, the filler material includes chemical binders which can bind certain pollutants, such as metals (e.g., arsenic, cadmium, chromium, cobalt, copper, lead, mercury, nickel, and/or selenium), hydrocarbons and/or organic chemicals (such as 2,4,6-trinitrotoluene), and/or nutrients (such as fertilizer, nitrates, phosphates, sewage, and/or animal waste).

In some embodiments, such as perhaps those involving water filtration, the particle size of the compost can conform to the following: 99% passing a 1 inch sieve, 90% passing a 0.75 inch sieve, a minimum of 70% greater than a 0.375 inch sieve, and/or less than 2% exceeding 3 inches in length.

In some embodiments, the filler material can include one or more fertilizers, flocculants, chemical binders, and/or water absorbers, any of which can be selected to address a particular need and/or problem, such as to fertilize the growth of a predetermined plant species and/or to bind a predetermined chemical.

The mesh container 140 filled with filler material 110 provides for an environmental control device 150. Mesh container 140 is designed to be fully biodegradable within a predetermined period of time of approximately three years to five years depending upon the configuration of the mesh container 140 while also having the strength to provide for its structural integrity enclosing or containing the filler material within the interior of the mesh container during its operational duration. In some embodiments, mesh container 140 includes viscose fibers. In one embodiment, at least some of the yarns of mesh container 140 are viscose fibers. In another embodiment, mesh container 140 consists of viscose fibers. In some embodiments, at least some of the yarns comprise two or more different fibrous components which may be, for example, viscose, hemp, flax, and cotton fibers. In some embodiments, the viscose fibers of the mesh of the environmental control device are fabricated from soft wood. In certain embodiments, the soft wood is spruce or poplar.

In the present disclosure, viscose refers to a type of rayon which is regenerated cellulose that is specifically sourced from a type of wood. In some embodiments, the wood may be a soft wood, such as poplar or spruce. In the present disclosure, viscose does not include other types of rayon or wood wool fibers which may be alternatively processed regenerated cellulose, such as for example, lyocell. The mesh container is preferably constructed utilizing yarns made from viscose fibers which are interlaced with each other preferably by knitting or weaving.

Besides the viscose fibers in mesh container 140, there may be additional fully biodegradable fibers such as cotton, flax and hemp that can be used in combination with the viscose fibers. These biodegradable fibers may be incorporated into a single yarn with the viscose fibers, forming a multicomponent yarn. For example, a multi-component yarn composed of viscose and hemp fibers may be used to fabricate the mesh. Alternatively, multiple different single component yarns may be used to fabricate the mesh. In some embodiments for example, a first single-component yarn made from viscose fibers and a second single-component yarn made from hemp fibers may be interlaced together to fabricate the mesh. In another embodiment, the mesh container may include viscose fibers in various combinations with other biodegradable natural fibers, such as flax or cotton. In another exemplary embodiment, a first single-component viscose yarn and second single-component flax yarn may be interlaced to form the mesh. In another embodiment, a first yarn made from viscose and a second yarn made from cotton may be used to fabricate the mesh. It is understood that the yarns may be combined in multiple ways, such as for example, a first yarn made of viscose, a second yarn made of hemp, and a third yarn made from flax, interlaced together to form the mesh.

In certain embodiments, the viscose fibers constitute one hundred percent of the fibers utilized in at least some of the yarns. In other embodiments, the viscose fibers constitute other percentages such as ninety-five percent, ninety-percent, eighty-five percent, eighty-percent, seventy-five percent, seventy percent, downwards to fifty-five percent. When the mesh is formed of a composite of viscose fibers and additional biodegradable fibers, the percentage of fibers which are not viscose fibers may constitute the remaining percentage from biodegradable fibers such as cotton, hemp and flax.

In the preferred embodiment, the yarn has a count of approximately eight hundred deniers. The yarn also has a twist factor between three hundred and twenty and four hundred. The mesh container may have a tensile strength of at least about 100 pounds per square inch using ASTM standard testing method D4595, depending on the composition of the mesh and which fibers are used in fabrication. In another exemplary embodiment, the mesh container has a tensile strength of at least about 150 pounds per square inch using ASTM standard testing method D4595. In the preferred embodiment the mesh container has a tensile strength of at least about 200 pounds per square inch using ASTM standard testing method D4595.

Preferably the mesh container includes yarns knitted together forming a mesh construction with one eighth inch openings. The netting material can have any mesh opening pattern, including diamond, hexagonal, oval, round, and/or square, etc. Mesh container 140 can be fabricated in standard lengths, such as any of approximately 1, 2, 3, 4, 5, 6, 7, 8, 9, 10, 15, 20, 25, 50, 75, 100, 125, 150, 200, 250, 300, 400, and/or 500 foot lengths, any of which can be coupled together to form a continuous mesh container of any size, including devices as long as 1000, 2000, 3000, 4000, 5000, 7500, and/or 10,000 or more feet. Therefore, in some embodiments, mesh container 140 can comprise a first tubular mesh container 141 and a second tubular mesh container 142. Thus, certain lengths of filled mesh containment systems can be intended to be portable, and other lengths of filled mesh containment systems can be intended to be immobile.

Storage container 120 can at least partially surround filler material 110, and can be a vessel, tank, hopper, truck, and/or pile, etc. Delivery mechanism 130 can be a hose, tube, pipe, duct, and/or chute, and can include a mechanical and/or pneumatic component, such as an auger, vibrator, and/or fan, etc. for biasing filler material 110 toward and/or into mesh container 140. Moreover, delivery mechanism 130 can be replaced with a manual approach. Delivery mechanism 130 can include a nozzle, reducer, and/or hose adaptor that allows a standard hose (such as a hose having an approximately 4- or 5-inch diameter) to fill a larger and/or smaller diameter mesh containment system.

In some embodiments, mesh container 140 can be unfilled, filled partially, or filled completely. In some embodiments, when filled completely, mesh container 140 can be generally curvilinear, round, oval, or polygonal in longitudinal cross-section. If generally oval, mesh container 140 can have a major diameter ranging from approximately 3 inches to approximately 30 inches.

In some embodiments, mesh container 140 can have opposing ends which may be shut. In one embodiment, the mesh container can take a tubular shape, and the device can have an end nearest the delivery device called the proximal end 142 and an end furthest the delivery device called distal end 144. Distal end 144 can be shut and/or sealed prior to the delivery of filler material 110 into mesh container 140. In some embodiments, the closing of the ends is such that they are irreversibly shut. In other embodiments, the closing of the ends is such that they may be re-opened using an opening and closing mechanism. In one embodiment, proximal end 142 can be shut and/or sealed after delivery of filler material 110 into mesh container 140. The method of closing and/or sealing either of ends 142 and 144 can include knitting, sewing, folding, welding, stapling, clipping, clamping, tying, knotting, and/or fastening, etc.

In some embodiments, attached to mesh container 140 is an anchoring device 146, such as a flap fabricated from mesh netting, such as that used to fabricate mesh container 140. Such a flap can range in dimensions with the size of the tube and/or the expected forces that might bear upon the tube. For example, an 8-inch diameter tube might have two 4-inch-wide flaps that are made from the same mesh material as the tube, and that extend along the entire length of the tube. In some embodiments, stakes can be driven through each of these flaps and into the underlying substrate. This can secure both sides of the tube and can create additional stability for the tube. In other embodiments, anchoring device 146 is anchored using a mechanism other than driving a stake through the mesh, such as for example, tying a string, rope, or cable tie, driving sod stakes, re-bar, or wood stakes through the mesh, hammering an anchor through the mesh, wiring the mesh, etc. It is understood that the anchors may be biodegradable, if so desired.

In some embodiments, the earth surface on which mesh container 140 is placed may be ground, soil, sand, coast, silt, sod, earth, dirt, clay, mud, peat, gravel, rock, asphalt, concrete, pavement, a streambed, a stream bank, a waterway bank, a pond bank, a ditch, a ditch bank, and/or a slope, etc. As an example, a metal or wooden stake could be hammered through a mesh-anchoring device 146 and into a ditch bed to secure a mesh container across the flow path of a ditch to form a "ditch check". Such a ditch check can slow water flow, encourage the deposition of silt and/or sediment, and/or potentially encourage the growth of plants whose root systems can further discourage run-off and/or erosion.

In one exemplary embodiment of the present disclosure, a method for forming an environmental control system is provided. The method may comprise providing one or more environmental control devices, wherein each environmental control device comprises a mesh container having at least one interior and one exterior surface and openings of a predetermined approximate size. The mesh also comprises viscose fibers and the interior of the mesh container comprises a filler material. Additionally, the one or more environmental control devices are positioned on an earth surface in a perceived path of water flow or runoff such that the environmental control devices will intersect the path thereby preventing or slowing the water flow or runoff. In some embodiments, the system may include one or more environmental control devices which prevent or slow the water flow or runoff, and also are positioned in such a way that the obstructed water flow is diverted to a different area, creating a runoff diversion.

In some embodiments, the mesh container of the one or more environmental control devices of the environmental control system is biodegradable and degrades within thirty-six months of environmental installation. In some embodiments, the mesh is formed by knit or woven yarns. In a preferred embodiment of the environmental control system, the yarns are comprised of one hundred percent viscose fibers.

In some embodiments, this system may be used for erosion control, sediment control, perimeter control, sediment trap, sediment barrier, slope interruption, check dam, inlet protection, runoff diversion, concrete washout, biofiltration, bioswale, passive filtration, stormwater filtration, wastewater filtration, riser pipe filtration, stormwater pretreatment, wastewater pretreatment, bank stabilization, channel restoration, stream restoration, riparian restoration, wetland restoration, living shoreline restoration, oyster bag restoration, and combinations thereof. In other embodiments, the system may be used to protect a coastal surface.

In some embodiments, the system is used to prevent or slow the flow or runoff of stormwater. In another embodiment, the system may be used to prevent or slow runoff carrying substances which are not desired to spread in an environment. For example, the system may be positioned around areas which may potentially harbor potent substances in places where biodegradable but high strength control systems are needed. For example, it has been shown that antibiotics administered to organisms on an agricultural site can re-enter the environment via soil diffusion, wastewater, or manure. These substances may further spread in the surrounding environments due to stormwater runoff. Spread of these environmental contaminants are a major public health concern around the world.

It is contemplated that the environmental control system may be used as a check dam. Check dams are generally used in ditches, channels and swales to protect specific areas by slowing concentrated stormwater flow velocity, reducing bed erosion and filtering sediment, pollutants and other particles. Check dams are highly effective at reducing flow velocities, simple to construct and require very low maintenance.

In another embodiment, the environmental control system may be used in concrete washout environments. Concrete washouts are implemented on construction projects where slurries—usually a mixture of cement and water—containing Portland cement concrete (PCC) or asphalt concrete (AC) are generated from coring, grinding, saw cutting and grooving. These slurries can also be generated by concrete trucks and other concrete-coated equipment when they are cleaned and washed on-site. Concrete waste management is a vital aspect of any construction project to protect the environment.

In another embodiment, the environmental control system may be used as a perimeter control. In another exemplary utilization, the device may be used for sediment control. Sediment controls act as barriers to retain sediment on a construction site. In general terms, sediment control products located at down gradient boundaries of the construction site are referred to as "perimeter controls". The environmental control device 150 controls the erosion of sediment and provides stormwater filtration of sediment and soluble pollutants such as phosphorus and petroleum hydrocarbons.

In other embodiments, the environmental control system may be used in a areas which requires a runoff diversion. A runoff diversion is used to redirect stormwater runoff from areas at risk of flooding or eroding towards stabilized areas, storm inlets, conveyance systems, containment areas, or stormwater treatment systems. The environmental control devices are generally positioned up-slope of disturbed areas. In runoff diversion applications, the environmental control system helps divert excess surface water from one area for use or safe disposal in other designated areas.

In another embodiment, the environmental control system is installed above steep slopes to limit surface runoff onto the slope, across long slopes to reduce slope length to prevent erosion, below steep grades where flooding, seepage, or sediment depositions may occur and around areas that are subject to damage from runoff.

In another embodiment, the environmental control system may be used for establishment of a temporary dry pond detention system used to capture sediment and settle suspended solids in runoff from disturbed soils less than 5 acres. For example, the system may capture sediment and settle suspended solids from detention pond outfalls and/or overflows. Sediment traps are commonly used at outlets of stormwater diversion structures, slope drains, construction site entrances, channels, and other runoff locations. Sediment traps can be converted to or retrofitted for use as a permanent stormwater detention system.

It may be seen that a more advantageous environmentally stable environmental control device may be had according to the present disclosure. By utilizing yarns which are comprised of one hundred percent biodegradable viscose fibers and which are interlaced in a woven or knitting manner forming a strong mesh an environmental control device suitable for erosion control may be formed. Filling the interior of the mesh container with biodegradable fillers and having a mesh comprised one hundred percent of biodegradable fibers provides for biodegradable system which enables the utilizer to solve the erosion control needs while not having to go back and remove the environmental control devices in the future.

According to another exemplary embodiment, an environmental control device is provided which comprises a biodegradable mesh container having at least one interior and one exterior surface and openings of a predetermined approximate size. The mesh comprises viscose fibers and the device has a tensile strength of at least about 100 pounds per square inch using ASTM standard testing method D4595. In some embodiments, the device has a tensile strength of at least about 150 pounds per square inch using ASTM standard testing method D4595. In the most preferred embodiment, the device has a tensile strength of at least about 200 pounds per square inch using ASTM standard testing method D4595.

Figure 2:
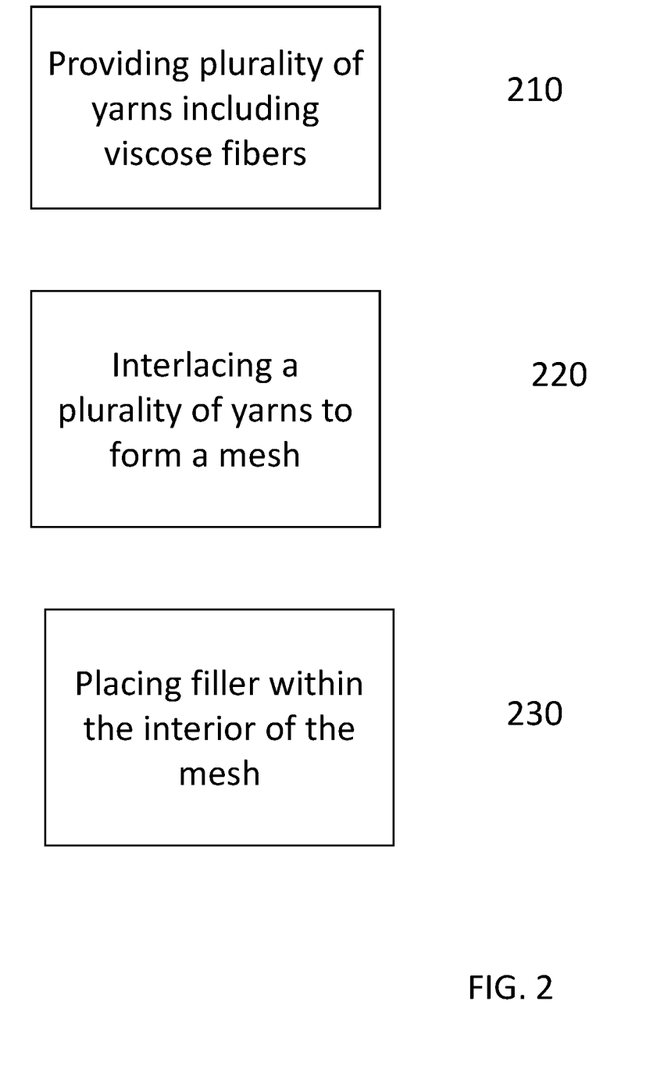
FIG. 2 is a flowchart of an embodiment of a method 200 of the present disclosure.

The present disclosure also provides a method for creating an environmental control device. As shown in FIG. 2, the method includes providing a plurality of yarns consisting of one hundred percent biodegradable viscose fibers at step 210. Interlacing the plurality of yarns at step 220 via knitting or weaving to form a mesh having an interior. Placing filler within the interior of the mesh at step 230 to create an environmental control device.

EXAMPLES

Example 1

To determine the performances of mesh containers created from different biodegradable materials, yarns were obtained from a commercially available source and knitted into 12-inch diameter mesh containers so that each mesh container was formed from a single type of yarn, cotton or viscose, as shown in Table 1. In other words, the entire plurality of yarns that were used to make each type of mesh container was of one fiber type. For example, the viscose-formulated mesh was formed using one hundred percent viscose fibers.

Replicates of five were produced of each type of mesh container and were then filled with compost filter media in accordance with USDA Natural Resources Conservation Service guidelines as described in Agronomy Technical Note No. 4 (https://www.nrcs.usda.gov/Internet/FSE-_DOCUMENTS/stelprdb1048852.pdf). The mesh types were then evaluated for tensile strength performance using ASTM D4595, the standard test method for tensile properties of geotextiles by the wide-width strip method. This tensile strength test is designed to evaluate knitted mesh materials with greater confidence and less variability in results between trials compared to other methods. Machine direction ultimate strength (MD-Ult) is commonly used to interpret tensile strength for mesh materials and the results of this performance testing are shown in Table 1. Other environmental control systems formed by nonbiodegradable materials, polypropylene and multi-filament polypropylene, were used as controls.

The non-biodegradable multi-filament polypropylene environmental control devices exhibited the highest tensile strength performance with an average ultimate machine direction value of 545 pounds and 32% elongation also in the same direction. Comparatively, polypropylene, a commonly used material for mesh containers but also not biodegradable, only exhibited a tensile strength of 124 pounds and 21% elongation. Notably, the biodegradable mesh devices performed better than the polypropylene control. The viscose devices exhibited 210 pounds for a machine direction test and elongated 29.3% on average. Cotton types 1 and 2, which differ in their mass per unit length, exhibited 292 and 193 pounds for the ultimate machine direction test, respectively. They also displayed elongation test result values of 349% and 27.1%, respectively.

TABLE 1

Tensile Strengths Determined Using ASTM D4595 Standard Testing Methods

| Material | Material Description Denier/ MIL | Tensile Strengths | | | |
|---|---|---|---|---|---|
| | | MD-Ultimate (lbs per square inch) | TD-Ultimate (lbs per square inch) | MD-Elongation (%) | TD-Elongation (%) |
| Multi-filament Polypropylene | 420 D | 545 | 226 | 32 | 88.9 |
| Polypropylene | 500 D | 124 | 73 | 21 | 83.1 |
| Viscose | 6 s | 210 | 289 | 29.3 | 41.6 |
| Cotton Type 1 | 10 to 1 | 292 | 43.1 | 34.9 | 396 |
| Cotton Type 2 | 8 to 1 | 193 | 158 | 27.1 | 81.1 |

Example 2

In another experiment, triplicates of different types of mesh containers were made and filled in the manner previously mentioned. The mesh containers were made from the following fibers: cotton, flax, viscose, and polylactic acid (PLA), which is a compostable bio-based plastic. As with example 1, each mesh device was made using a single fiber type. Evaluation of the performances of the different types of environmental control devices were conducted in three different research stations located in southern California, southern Georgia, and the central coast of North Carolina, respectively. These locations were chosen because they represent sites with maximum exposure to moisture, ultraviolet light, and high temperatures, which are three environmental factors that enhance degradation due to microorganismal activity and thus, most significantly determine the functional longevity of mesh containers on land.

All environmental control systems were installed on bare soil or coastal surface, as they would be in typical field applications. The experimental control devices were then visually inspected monthly for a total of 18 months. The devices placed on soil were specifically observed for material biodegradation on the underside of the mesh because environments wherein moisture is more easily trapped after rainfall, such as the site where the device meets the soil, are more likely to harbor rich microbial and fungal communities (Meisner et al., 2018) that would more rapidly facilitate degradation. For the devices placed on the coastal surface in North Carolina, hydrolysis of the underside was recorded. The main drivers of degradation for these devices were marine microorganismal communities, as well as physical degradation due to continuous saltwater submersion caused by flood and ebb currents of the tide.

Ultraviolet degradation was examined on the top service of the devices. Additionally, the timepoints at which photodegradation caused holes to form in the mesh that measured over a certain size threshold of two inches (large holes) were recorded. Functional longevity, the time period during which the device is capable of providing its intended use, was also estimated for each type of device. Table 2 shows the results of all performance testing as averages for triplicates at each site.

TABLE 2

Evaluation of Cotton, Flax, and Viscose-Formulated Environmental Control Devices

| | Material | Biodegradation Month (complete) | Photodegradation Month (large holes) | Estimated Functional Longevity (months) |
|---|---|---|---|---|
| California | Cotton | 5 | 16 | up to 12 |
| | Flax | 7 | 16 | up to 12 |
| | Viscose | 9 | Not Observed | up to 18 |
| | PLA | Not Observed | Not Observed | >18 |
| Georgia | Cotton | 5 | 12 | up to 12 |
| | Flax | 7 | 12 | up to 12 |
| | Viscose | 9 | 18 | up to 18 |
| | PLA | Not Observed | Not Observed | >18 |
| North Carolina (Coast) | Cotton | 1 | 1 | 1 |
| | Flax | 1 | 1 | 1 |
| | Viscose | 16 | 16 | up to 18 |
| | PLA | 21 | 21 | up to 24 |

Biodegradation trends were observed among the three testing sites. Complete biodegradation was recorded at month 9 for the viscose-formulated mesh in both California and Georgia, and month 16 for the coastal surface in North Carolina. Viscose outlasted the cotton- and flax-formulated mesh, which degraded fully at months 5 and 7 at both sites. Interestingly, cotton and flax mesh devices only lasted one month on the coast, suggesting that these types of mesh would be a poor choice for long-term coastal environmental control. Notably, viscose mesh only biodegraded five months before the PLA control. The control also did not exhibit any biodegradation at the California and Georgia sites during this experiment.

Photodegradation, as measured by holes above a certain threshold in size, was observed at months 16 and 12 for cotton and flax, respectively, in non-coastal sites. Viscose mesh containers in California were not observed to develop large holes due to photodegradation at all during the course of the experiment, reached the photodegradation point at month 18 in Georgia, and month 16 in North Carolina. Again, cotton and flax mesh had reached this photodegradation threshold in the first month on the coast.

Functional longevity for cotton and flax in California and Georgia was estimated to be up to 12 months and longevity was estimated at only 1 month in North Carolina. Notably, the viscose-formulated mesh, was estimated to maintain functionality for up to 18 months in all three sites. The high functional longevity exhibited by the knitted, viscose-formulated mesh in harsh environments suggests viscose may be an optimal material for an environmental control device.

While the invention has been described in detail herein in accordance with certain preferred embodiments thereof, many modifications and changes therein may be effected by those skilled in the art. Accordingly, the foregoing disclosure should not be construed to be limited thereby but should be construed to include such aforementioned obvious variations and be limited only by the spirit and scope of the following claims.

What is claimed is:

1. An environmental control device comprising:
   a mesh container having at least one interior and one exterior surface and openings of a predetermined approximate size;
   wherein the mesh comprises biodegradable viscose fibers;
   wherein the interior of the mesh container comprises a filler material; and
   further wherein the mesh container has a tensile strength of at least about 100 pounds per square inch.

2. The environmental control device of claim 1, wherein the environmental control device is biodegradable.

3. The environmental control device of claim 1, wherein tensile strength is determined using ASTM standard testing method D4595.

4. The environmental control device of claim 3, further having a tensile strength of at least about 150 pounds per square inch using ASTM standard testing method D4595.

5. The environmental control device of claim 4, further having a tensile strength of at least about 200 pounds per square inch using ASTM standard testing method D4595.

6. The environmental control device of claim 1, wherein the mesh comprises interlaced yarns.

7. The environmental control device of claim 6, wherein the yarns are interlaced by knitting or weaving.

8. The environmental control device of claim 6, wherein at least some of the yarns are viscose fibers.

9. The environmental control device of claim 6, wherein at least some of the yarns comprise two or more different fibrous components.

10. The environmental control device of claim 9, wherein the fibrous components are selected from the group consisting of viscose, hemp, flax, and cotton fibers.

11. The environmental control device of claim 1, wherein the mesh container is configured to be closed off at two opposed ends.

12. The environmental control device of claim 1, wherein the mesh consists of viscose fibers.

13. The environmental control device of claim 1, wherein the viscose fibers are fabricated from soft wood.

14. The environmental control device of claim 13, wherein the wood is spruce or poplar.

15. The environmental control device of claim 1, wherein the mesh container comprises one or more fibers selected from the group consisting of viscose, cotton, flax, and hemp fibers.

16. The environmental control device of claim 15, including a first yarn made from viscose fibers and a second yarn made from hemp fibers; and wherein the viscose fiber yarn and the hemp fiber yarn are interlaced to form the mesh container.

17. The environmental control device of claim 15 including a first yarn made from viscose fibers and a second yarn made from cotton fibers; and
wherein the viscose fiber yarn and the cotton fiber yarn are interlaced to form the mesh container.

18. The environmental control device of claim 15 including a first yarn made from viscose fibers and a second yarn made from flax fibers; and
wherein the viscose fiber yarn and the flax fiber yarn are interlaced to form the mesh container.

19. The environmental control device of claim 1, wherein the filler material includes a member selected from the group consisting of compost, composted organic materials, organic feedstocks, composted products, mulch, wood shavings, alum, lime, clay, pea gravel, gravel, sand, soil, wood chips, bark, peat, soil blends, straw, hay, leaves, sawdust, paper mill residuals, wood wastes, wood pellets, hemp, bamboo, biosolids, coconut fibers, coir, wheat straw, rice straw, rice hulls, oat straw, soybean hulls, palm wastes, palm leaves, agricultural waste products, manure, wool, hair, sugar cane bagasse, seed hulls, jute, flax, hulls, organic waste, cat litter, plant seeds, plugs, sprigs, spores, fertilizers, flocculants, chemical binders, water absorbers and combinations thereof.

20. The environmental control device of claim 1, wherein the environmental control device filters water.

21. The environmental control device of claim 1, wherein the mesh container degrades within at least thirty-six months of environmental installation.

22. The environmental control device of claim 1, wherein the device has a tensile strength of at least about 200 pounds per square inch as measured using ASTM standard testing method D4595 and a yarn count of at least eight hundred deniers.

23. The environmental control device of claim 1, further having an additional mesh through which an anchoring tool can be placed to secure the device onto the earth surface.

24. The environmental control device of claim 1, wherein the mesh container has a diameter greater than about four inches.

25. A method of forming an environmental control system comprising:
providing one or more environmental control devices;
each environmental control device comprising a mesh container having at least one interior and one exterior surface and openings of a predetermined approximate size;
wherein the mesh comprises biodegradable viscose fibers and the interior of the mesh container comprises a filler material;
wherein the one or more environmental control devices are positioned on an earth surface in a perceived path of water flow or runoff such that the one or more environmental control devices will intersect the path thereby preventing or slowing the water flow or runoff; and
further wherein each of the mesh containers has a tensile strength of at least about 100 pounds per square inch using ASTM standard testing method D4595.

26. The method of claim 25, wherein the mesh container degrades within thirty-six months of environmental installation.

27. The method of claim 26, wherein the mesh is formed by woven or knit yarns.

28. The method of claim 27, wherein the yarns are comprised of one hundred percent viscose fibers.

29. The method of claim 25, wherein the one or more environmental control devices are positioned such that the water flow obstructed by the environmental control system is diverted to a different area, thereby creating a runoff diversion.

30. The method of claim 25, wherein the earth surface is a coastal surface.

31. The method of claim 25, wherein the environmental control system prevents erosion of an earth surface.

32. The method of claim 25, wherein the water flow is that of stormwater.

33. The method of claim 25, wherein the runoff carries substances which are not desired to spread in an environment.

34. The method of claim 25, wherein the environmental control system is used for an application selected from the group consisting of erosion control, sediment control, perimeter control, sediment trap, sediment barrier, slope interruption, check dam, inlet protection, runoff diversion, concrete washout, biofiltration, bioswale, passive filtration, stormwater filtration, wastewater filtration, riser pipe filtration, stormwater pretreatment, wastewater pretreatment, bank stabilization, channel restoration, stream restoration, riparian restoration, wetland restoration, living shoreline restoration, oyster bag restoration, and combinations thereof.

35. An environmental control device comprising:
a biodegradable mesh container having at least one interior and one exterior surface and openings of a predetermined approximate size;
wherein the mesh comprises biodegradable viscose fibers; and
wherein the environmental control device has a tensile strength of at least about 100 pounds per square inch using ASTM standard testing method D4595.

36. The environmental control device of claim 35, wherein the environmental control device has a tensile strength of at least about 150 pounds per square inch using ASTM standard testing method D4595.

37. The environmental control device of claim 35, wherein the environmental control device has a tensile strength of at least about 200 pounds per square inch using ASTM standard testing method D4595.

* * * * *